United States Patent [19]

Dailey et al.

[11] Patent Number: 5,044,200
[45] Date of Patent: Sep. 3, 1991

[54] ALL PURPOSE LAWN AND GARDEN MARKER

[75] Inventors: C. Millard Dailey, Peoria; John F. Chmela, Mt. Prospect, both of Ill.

[73] Assignee: Green Genie Products, Inc., Peoria, Ill.

[21] Appl. No.: 555,199

[22] Filed: Jul. 20, 1990

[51] Int. Cl.⁵ .................. G01F 19/00; G09F 19/00
[52] U.S. Cl. ........................... 73/427; 73/171; 73/426; 40/607; 52/104; 52/103; 116/227
[58] Field of Search .................. 73/171, 426, 427; 116/227, 276; 40/645, 607; 52/103, 105, 104

[56] References Cited

U.S. PATENT DOCUMENTS

| D. 232,859 | 9/1974 | Colquit, Jr. | 73/171 X |
|---|---|---|---|
| 1,674,005 | 6/1928 | Eschenbach | 40/645 |
| 1,869,913 | 8/1932 | Rosenbluth | 40/645 |
| 2,350,316 | 5/1944 | Meyer et al. | 40/607 |
| 2,554,050 | 5/1951 | Neubeck | 73/426 X |
| 2,601,783 | 7/1952 | Rouse et al. | 73/427 X |
| 3,535,925 | 10/1970 | Woofter | 73/171 |
| 4,106,336 | 8/1978 | Marley | 73/171 |
| 4,173,086 | 11/1979 | Hempfling | 40/645 X |
| 4,233,769 | 11/1980 | Archer | 40/607 |
| 4,393,622 | 7/1983 | Gallo, Sr. | 40/645 X |

Primary Examiner—William A. Cuchlinski, Jr.
Assistant Examiner—G. Bradley Bennett

[57] ABSTRACT

An all purpose lawn and garden marker which is molded of a plastic material and therefore can be inexpensively manufactured. In addition, the marker is adapted to hold the required notice that a lawn has been chemically treated as well as other advertising material. The marker also functions as a water gauge so that the homeowner can determine the extent to which the lawn has been watered. Further still, the marker has a mowing height gauge to aid the homeowner in cutting the grass to the proper level. The homeowner can also utilize the marker in his garden to post a notice as to what is planted in the garden and to indicate the extent to which his garden has been watered.

2 Claims, 2 Drawing Sheets

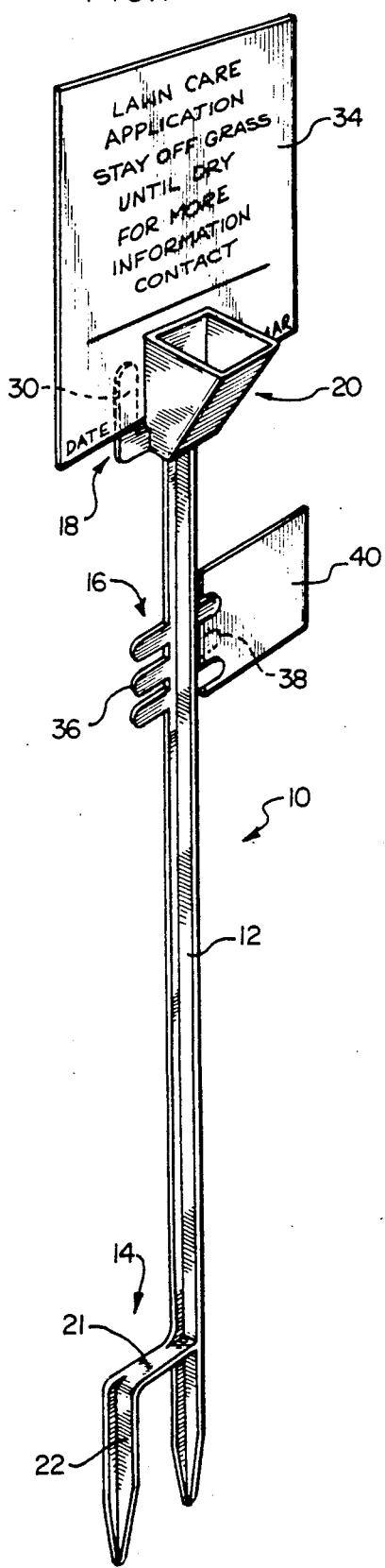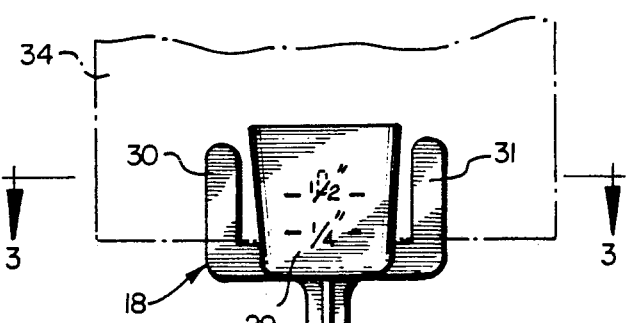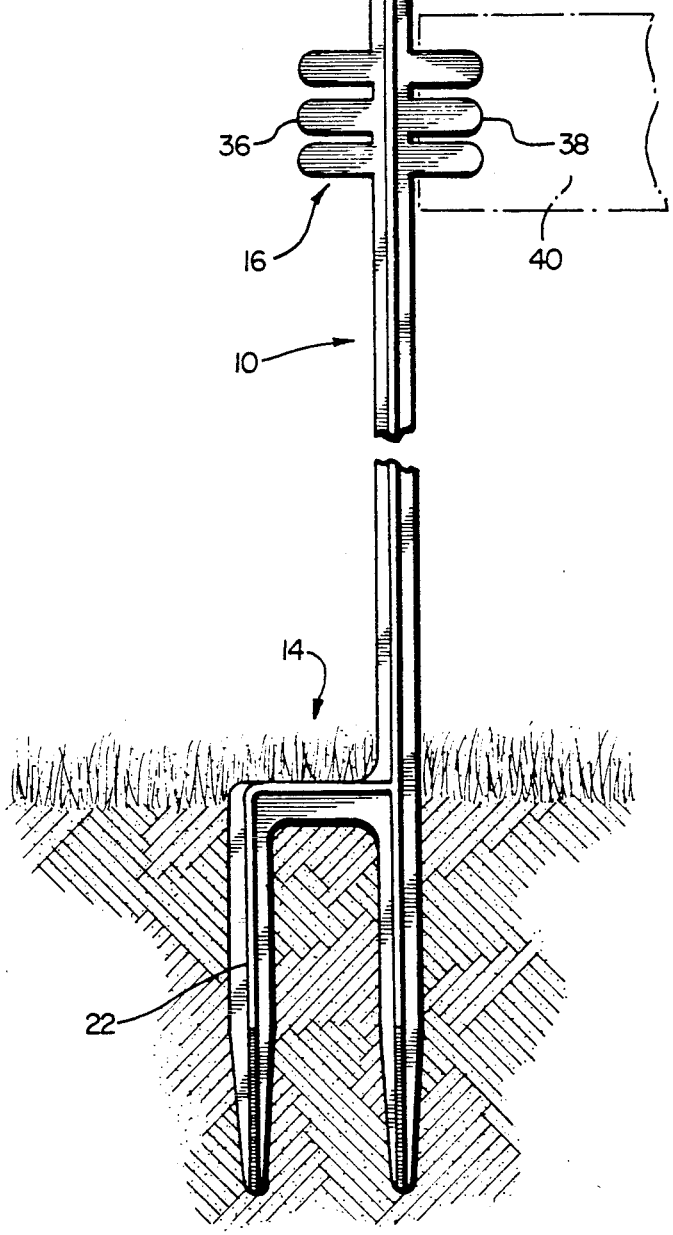

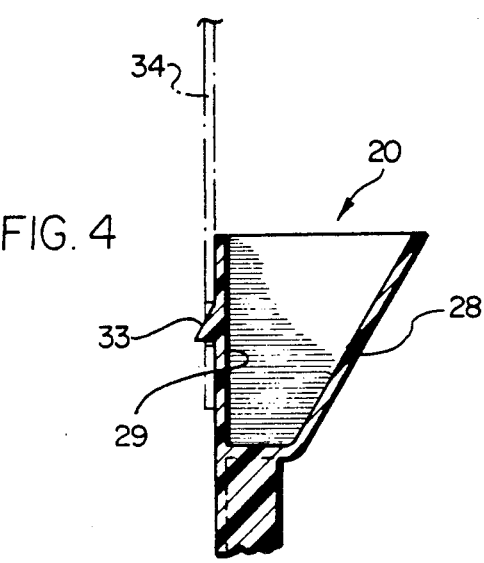
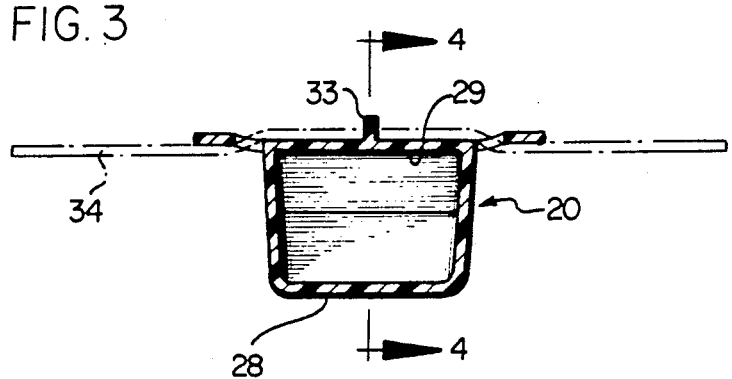
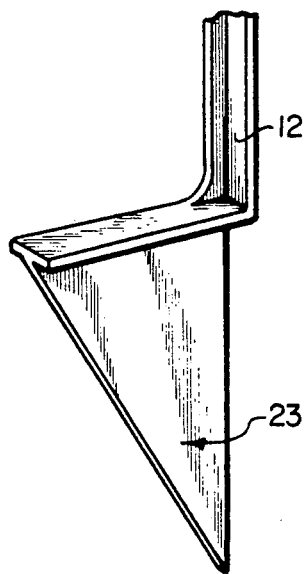
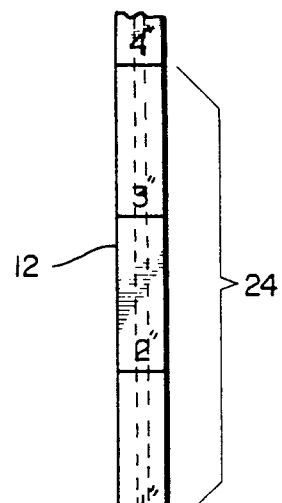

ALL PURPOSE LAWN AND GARDEN MARKER

This invention relates to an improved lawn and garden marker. In particular, it relates to a marker adapted to provide a plurality of functions and, in this respect, the marker is of an initial great utility to lawn care service companies and thereafter to homeowners.

As to a use to lawn care service companies, many states now require a notice be posted to advise others of the fact that a lawn has been treated with certain lawn chemicals. These companies therefore incur an added expense to post these notices, and are seeking an inexpensive marker. Further still, these lawn care service companies desire to advertise their services so that others in the neighborhood will engage them for their lawn care services. They may also desire to display some other promotional or advertising material. Also, in many cases, after a lawn has been treated with these lawn chemicals, the lawn should be properly watered so as to provide the maximum benefit of these lawn chemicals. The lawn care service company may advise the homeowner of this, but it normally is difficult for the homeowner to determine if he has properly watered his lawn. Accordingly, it is advantageous to both the company and the homeowner to be able to ascertain if the lawn has been properly watered.

The marker of the present invention satisfies all of these requirements. The marker is molded of a plastic material and therefore can be inexpensively manufactured. In addition, the marker is adapted to hold the required notice that the lawn has been chemically treated as well as other advertising material. The marker also functions as a water gauge so that the homeowner can determine the extent to which the lawn has been watered. Further still, the marker has a mowing height gauge to aid the homeowner in cutting the grass to the proper level. The homeowner can also utilize the marker in his garden to post a notice as to what is planted in the garden and to indicate the extent to which his garden has been watered.

Accordingly, it is an object of the invention to provide an improved lawn and garden marker for use by lawn service companies and the homeowner.

The above as well as other objectives not specifically mentioned will become apparent from the description below when taken in consideration with the following drawings wherein:

FIG. 1 is a perspective plan view of a marked exemplary of the invention;

FIG. 2 is a front plan view of the marker;

FIG. 3 is a top plan view of the water gauge of the marker of FIG. 1;

FIG. 4 is a sectional view taken along lines 4—4 of FIG. 3;

FIG. 5 is a partial side plan view of the marker illustrating the mowing height guide on the stake portion; and FIG. 6 is a partial perspective plan view of the marker illustrating a modified version of the foot portion thereof.

Referring now to the drawing, there is disclosed an all purpose lawn and garden marker 10 which preferably and advantageously is molded of a sturdy plastic material. When molded of a plastic material, the marker 10 can be inexpensively manufactured. The marker 10 generally comprises a stake portion 12, a foot portion 14, and a message clip portion 16, a sign holder portion 18, and a water gauge 20, all molded so as to be integrally formed.

The stake portion 12 is generally T-shaped in cross-section for additional strength, and can be of any desired length. Preferably, however, the stake portion 12 is approximately 12" to 15" in length so that the notice and any messages attached to and held by the marker 10 are held high enough so as to be visibly apparent to anyone within a reasonable distance from the marker 10. The stake portion 12 preferably is pointed at its lower end so that it can be more easily pushed into the ground. The stake portion 10 also preferably has a foot portion 14 provided at its lower end. In the illustrated embodiment, the foot portion 14 is a generally inverted L-shaped member. The leg 21 thereof extends horizontally and provides a platform to step on to assist in pushing the stake portion 12 into the ground. The other leg 22 thereof functions to strengthen the foot portion 14 when it is used to push the stake portion 12 into the ground. It also functions to stabilize the marker 10 so that the marker 10 stands vertically upright. The foot portion 14 could also be simply a triangular shaped wedge 23, as shown in FIG. 6, integrally formed on the side of the stake portion 12 in a fashion such as to provide a platform to step on to push the stake portion 12 into the ground. Other shapes likewise could be used.

The stake portion 12 also has indicia 24 on it which functions to indicate the height of the grass when the stake portion 12 is pushed into the ground up to the level of the leg 22 of the foot portion 14. The indicia 24 therefore functions as a mowing height guide to aid the homeowner in cutting grass to the proper height.

The water gauge 20 is integrally affixed to the top of the stake portion 12. The water gauge 20, as illustrated, is a generally trapazoidal-shaped cup which is open at its top. The cup is proportioned so that water collected in it represents a quantity of water and its front wall 28 has indicia 29 on it that is graduated such that the water collected in the cup represents $\frac{1}{4}"$, $\frac{1}{2}"$ of water that has fallen on the lawn.

The sign holder portion 18 generally comprises two vertically disposed legs 30 and 31 which are spaced apart on opposite sides of the water gauge 20. The back wall 32 of the water gauge 20 together with the two vertical legs 30, 31 function to vertically support a card 34 which may have on it the notice required by many states to advise others that the lawn has been chemically treated. The card 34 is simply inserted between the two legs 30 and 31 and the back wall 32 of the water gauge 20 such that the two legs 30 and 31 are in one side of the card 34 and the back wall 32 of the water gauge 20 is on its other side. The card 34 may have a hole punched in it, and a projection 33 can be provided on the back wall 29 of the water gauge 20. The projection 33 engages within the hole in the card 34 to securely retain the card on the marker 10.

The message clip portion 16 is located a short distance below the water gauge 20 and comprises two sets 36 and 38 of three fingers which are integrally formed with the stake portion 12 to extend horizontally outward, with one set of fingers 36, 38 on each of the opposite sides of the stake portion 12. Each of the sets 36, 38 of fingers function as clips for holding a card 40 or the like to display a company logo or other promotional or special messages.

Accordingly, it can be seen that the lawn and garden marker serves many different functions, and can be used by a lawn care service company to post the notice required to advise others of the fact that the lawn has been chemically treated as well as other promotional and special messages. When it is desirable to water the lawn after certain chemicals and the like are applied, the water gauge 20 functions to tell the homeowner approximately how much water has been sprinkled or has rained on the lawn. The indicia 24 on the stake portion 12 indicates to the homeowner the height of the grass and aids him in cutting the grass to the proper length. The foot portion 14 assists in pushing the stake portion 12 into the ground so that it is more easily pushed into the ground particularly when the ground is very dry and hard.

The marker also can be subsequently used by the homeowner as a rain gauge, or it can be used in a garden to indicate what is planted and the extent to which the garden has been watered.

What is claimed is:

1. A lawn and garden marker comprising a stake portion; a water gauge at the top end of said stake portion; a sign holder, said sign holder portion comprising a pair of spaced apart legs formed at the top end of said stake portion, said spaced-apart legs and said water gauge being disposed with respect to one another to vertically support between them a sign; a platform integrally molded with said stake portion, said platform being substantially horizontally disposed and providing a step to step on to assist in pushing the stake portion into the ground; said water gauge having indicia on at least one wall thereof graduated so as to provide an indiciation of the amount of rain fall or water sprinkled on the lawn; and indicia on said stake portion for providing an indication of the height of the grass.

2. The marker of claim 1 wherein said platform comprises a foot portion integrally molded with said stake portion, said foot portion comprising a generally inverted L-shaped member having one leg thereof extending substantially horizontally from said stake portion and providing a step to assist in pushing said stake portion into the ground, the other leg thereof extending substantially vertical to said one leg and being pushed into the ground when said stake portion is pushed into the ground, said other leg providing additional strength to said one leg when it is used to push said stake portion into the ground and stabilizing said sign holder when said stake portion and said other leg is pushed into the ground.

* * * * *